United States Patent
Wyld et al.

[11] Patent Number: 5,978,933
[45] Date of Patent: *Nov. 2, 1999

[54] GENERIC FAULT TOLERANT PLATFORM

[75] Inventors: Brian Christopher Wyld, Crolles; Jean-Michel Rosset, Grenoble; Pierre Sauvage, Notre Dame de Commiers; Denis Pierrot, Eybens; Pierre D. M. Rondel, Seyssins, all of France

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/584,830

[22] Filed: Jan. 11, 1996

[51] Int. Cl.$^6$ .................................................. G06F 11/00
[52] U.S. Cl. .................................................. 714/13
[58] Field of Search ................. 395/182.08, 182.09, 395/182.1, 182.11, 181, 185.08, 182.04, 182.05, 291, 296, 728, 182.02; 711/147, 151

[56] References Cited

U.S. PATENT DOCUMENTS

| | | | |
|---|---|---|---|
| 4,356,546 | 10/1982 | Whiteside et al. | 395/182.08 |
| 4,358,823 | 11/1982 | Mcdonald et al. | 395/182.09 |
| 4,610,013 | 9/1986 | Long et al. | 395/182.09 |
| 4,710,926 | 12/1987 | Brown et al. | 395/182.02 |
| 4,817,091 | 3/1989 | Katzman et al. | 395/182.09 |
| 5,003,464 | 3/1991 | Ely et al. | 395/182.09 |
| 5,155,729 | 10/1992 | Rysko et al. | 395/182.09 |
| 5,202,887 | 4/1993 | Ueno et al. | 395/182.04 |
| 5,235,700 | 8/1993 | Alaiwan et al. | 395/182.11 |
| 5,313,386 | 5/1994 | Cook et al. | 395/182.08 |
| 5,345,590 | 9/1994 | Ault et al. | 395/650 |
| 5,363,503 | 11/1994 | Gleeson | 395/182.08 |
| 5,398,329 | 3/1995 | Hirata et al. | 395/182.09 |
| 5,416,921 | 5/1995 | Frey et al. | 395/182.05 |
| 5,434,998 | 7/1995 | Akai et al. | 395/182.09 |
| 5,487,149 | 1/1996 | Sung | 395/182.08 |
| 5,500,945 | 3/1996 | Maeda et al. | 395/182.09 |
| 5,548,743 | 8/1996 | Sugiyama et al. | 395/183.18 |
| 5,555,404 | 9/1996 | Torbjornsen et al. | 395/182.08 |
| 5,590,277 | 12/1996 | Fuchs et al. | 395/183.14 |
| 5,630,134 | 5/1997 | Haga | 395/676 |
| 5,812,757 | 9/1998 | Okamoto et al. | 395/182.09 |

*Primary Examiner*—Robert W. Beausoliel, Jr.
*Assistant Examiner*—Pierre Eddy Elisca

[57] ABSTRACT

A fault tolerant platform is provided that comprises two systems running pairs of processes in the active and standby state, one process from each pair running on each system. Each system comprises a fault-tolerance controlling process, first communication channels provided between the fault-tolerance controlling process and the processes in the active or standby state running on its system, and second communication channels provided between the fault-tolerance controlling processes. Management of fault tolerance (that is, promoting a process in a standby state to the active state, and making a process in an active state exit from the active state) is handled by the fault-tolerance controlling processes. A generic management of fault tolerant processes is thus provided in which fault detection and switchover is carried out independently of the applications. The invention thus ensures efficient and coherent switchover between active and standby processes.

22 Claims, 4 Drawing Sheets

GENERIC FAULT TOLERANT PLATFORM

FIELD OF THE INVENTION

The invention relates to a fault tolerant platform comprising at least two systems, at least a process in an active state running on one system, and at least one peer process in a standby state running on another system.

It also relates to a method for managing fault tolerance in such a platform. Finally, it also relates to a method for preventing split brain syndrome in a fault tolerant platform.

BACKGROUND OF THE INVENTION

There are many software applications, notably in the field of telecommunications, that require fault tolerance (referenced "FT" in the rest of this specification) in order to ensure continuity of operation.

To provide fault tolerance, it is known to duplicate a process running on a platform, so as to obtain an active process and an standby process. If the active process goes down, the standby process is promoted to the active state, and all communications with the formerly active process are switched to the new active process.

It was also suggested to have a standby process for several active ones, and to promote similarly the standby process to an active state when one of the active processes goes down.

Another known solution is to provide several active processes, without any standby process: when one of these active processes goes down, its functions and activity are switched to one or several other active processes.

In the prior art, all these solutions are provided on an application basis. In other words, each application running on a platform will manage its own active and/or standby processes, independently of any other application that may also have fault tolerant capabilities. This is resource-consuming, and also involves providing fault-tolerance separately in each application.

Accordingly, it is an object of the invention to reduce the need for resources in fault tolerant platforms, and also to reduce the need for providing fault tolerance in every application.

Another problem in such fault tolerant systems is the so-called split-brain syndrome. This problem occurs in fault tolerant systems, if at least one process has a faulty view of reality. For instance, this may occur if there is a communication problem between nodes or processes; the communication problem may have any origin, such as a physical breakdown of the communication link, a bug in one or several processes, a time-out affecting one or several process, or traffic congestion.

In this case, several process may come into conflict for resources. In the example of a communication problem between a standby and an active process, the standby process may consider the active process dead and try to grab resources, while the active process with continue using the same resources. This usually leads to catastrophic or unstable situations.

A quorum solution to split-brain syndrome has been proposed, in a system with more than two nodes or processes in communication. Where a communication problem creates two groups of nodes or processes, thus leading to a possible split brain syndrome, a decision rule determining that it is the group with the majority of nodes which should remain active is applied by all the nodes or processes.

This quorum method will not work for systems in which there is an even number of nodes, where the communication failure creates two groups comprising of the same number of nodes or processes. The quorum method is also inefficient for multiple communication failures that may create several groups of nodes, none of which has the quorum majority. Finally, the quorum method will not work where only two processes are in communication.

Accordingly, it is further object of the invention to provide a simple solution to the split-brain syndrome, that will prove efficient in the above configuration, and especially in the case of a communication between an active and a standby process in a fault tolerant system.

SUMMARY OF THE INVENTION

According to the present invention, there is provided a fault tolerant platform comprising at least two systems; at least a process in an active state running on one system; at least one peer process in a standby state running on another system; fault-tolerance manager means for promoting a process in a standby state to the active state, and for making a process in an active state exit from the active state; and first communication channels between a process in an active state and said fault-tolerance manager means and between a process in an standby state and said fault-tolerance manager means.

Preferably, said fault-tolerance manager means are fault tolerant.

In a preferred embodiment, said fault-tolerance manager means comprise a fault-tolerance controlling process running on each system; said first communication channels comprise a communication channel between a process in an active or standby state running on a system and the fault-tolerance controlling process running on this system, and said platform further comprises second communication channels between said fault-tolerance controlling processes, for exchanging health monitoring and status messages.

In this case, the fault tolerant platform may further comprise a third communication channel between a process in an active state and a peer process in the standby state, for exchanging health monitoring and replication data messages.

In another preferred embodiment, the fault tolerant platform further comprises at least a user process, and fourth communication channels between said user process and said process in the active state, and between said user process and said process in the active state.

The invention also provides a method for managing fault tolerance in a platform comprising at least two systems; at least a process in an active state running on one system; at least one peer process in a standby state running on another system; fault-tolerance controlling means; and first communication channels between a process in an active state and said fault-tolerance controlling means and between a process in an standby state and said fault-tolerance controlling means; in this method, promotion of a process from a standby state to the active state, and exit of a process in an active state exit from the active state are controlled by the fault-tolerance controlling means.

The fault-tolerance controlling means may comprise a fault-tolerance controlling process running on each system and second communication channels between said fault-tolerance controlling processes, and in this case, a fault-tolerance controlling process running on a system is preferably responsible for promoting processes running on said system to the active state, and for making processes running on said system exit from the active state.

In this case, the method preferably comprises mutual health monitoring of said fault-tolerance controlling processes on said second communication channels.

According to a preferred embodiment of the invention, a fault-tolerance controlling process running on a system informs each fault-tolerance controlling process running on another system of a state of processes running on its system, on said second communication channels.

According to another preferred embodiment of the invention, a process running on a system informs the fault-tolerance controlling process running its system of its state, on said first communication channels.

According to an embodiment of the invention, the platform comprises third communication channels between a process in an active state running on one system and a peer process in a standby state running on another system, and the method comprises mutual health monitoring of said processes in an active and standby state on said third communication channels.

In an embodiment of the invention, the platform comprises third communication channels between a process in an active state running on one system and a peer process in a standby state running on another system, and a process running on a system informs its peer process of its state using said third communication channels.

It is also possible that a process running on a system informs the fault-tolerance controlling process running on its system of the state of its peer process using said first communication channels.

The platform may comprise third communication channels between a process in an active state running on one system and a peer process in a standby state running on another system, and in this case, a process running on a system may exchange replication data messages with its peer process, using said third communication channels.

In a preferred embodiment of the invention, the platform further comprises at least a user process, and fourth communication channels between said user process and a process in the active state, and between said user process and a peer process in the standby state; in this case, said process in the active state, and said peer process in the standby state are grouped under a class name, and user process sends messages to the class name, said messages being directed to the process in the active state transparently for the user process.

The invention also relates to a method for managing fault tolerance, wherein said platform further comprises at least a user process, and fourth communication channels between said user process and a process in the active state, and between said user process and a peer process in the standby state, and wherein replication messages are sent by the user process to the process in the standby state.

According to the invention, there is also provided a method for preventing split brain syndrome in a fault tolerant platform having at least one process in an active state and at least one process in a standby state, switchover capabilities for promoting a process in the standby state to an active state, and resources dedicated to the processes in the active and standby states, wherein simultaneous access to the dedicated resources is limited to a maximum number of processes in the active state, and priority of access to the resources is given to processes last promoted to the active state, and wherein a process in the active state leaves its active state when it cannot obtain access to the dedicated resources.

In this method, said fault tolerant system preferably has one process in the active state and one process in the standby state, and access to the dedicated resources is limited to one process in the active state.

In a preferred embodiment, an active process that leaves its active state informs other processes in a standby or active state.

BRIEF DESCRIPTION OF THE DRAWINGS

A fault tolerant system embodying the invention will now be described, by way of non-limiting example, with reference to the accompanying diagrammatic drawings, in which.

BEST MODE OF CARRYING OUT THE INVENTION

Figure 1:
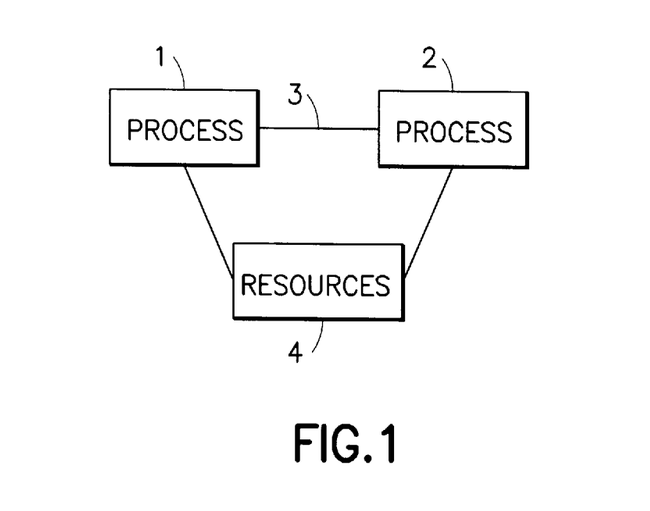
FIG. 1 is a fault tolerant system with an active and a standby process.

The fault tolerant system shown in FIG. 1 comprises two processes 1 and 2, communicating via a communication channel 3. Basically, in a fault tolerant system one of these processes—say process 1 for example—is active while the other one is on standby. The two processes share common resources 4, that are dedicated to these two processes. These resources 4, in one embodiment of the invention, may for instance comprise a signalling interface unit shared between processes 1 and 2 only.

As usual in fault tolerant systems, the health or operation of the processes is continuously monitored; one implementation for this could for instance be the use of a heartbeat mechanism between the two processes, in which each process regularly sends heartbeat messages and monitors the reception of heartbeat messages from the other process or processes. Other solutions are possible.

For any reason, standby process 2 may believe that active process 1 has died or ceased to operate. This may occur if active process has indeed died, and if heartbeat messages are no more received. It may also be the case if there is some communication problem on channel 3. To provide fault tolerance, standby process 2 will then be promoted to active, and will try to seize common resources 4.

In order to avoid this leading to split brain syndrome, the invention proposes that formerly active process 1, if it detects that common resources 4 are being seized, or have been seized, commits "suicide", that is, leaves its active state.

This will ensure that there is never any split brain syndrome in as much as the two processes will not enter a conflict. The solution provided by the invention is simple and efficient in the case of the two processes only, and provides a stable solution in every case: once the formerly active process has suicided, the formerly standby process is active, and there is no possible conflict; if necessary, the formerly active and suicided process may be restarted, as a new standby process.

The invention may be implemented, at active process level by providing means for determining whether common resources shared with the relevant standby process or processes are being seized by another process. These means are conveniently provided at the place where resources are usually being accessed. If these means determine that the common resource is not available—for instance if an error message is returned—the active process will suicide.

Figure 2:
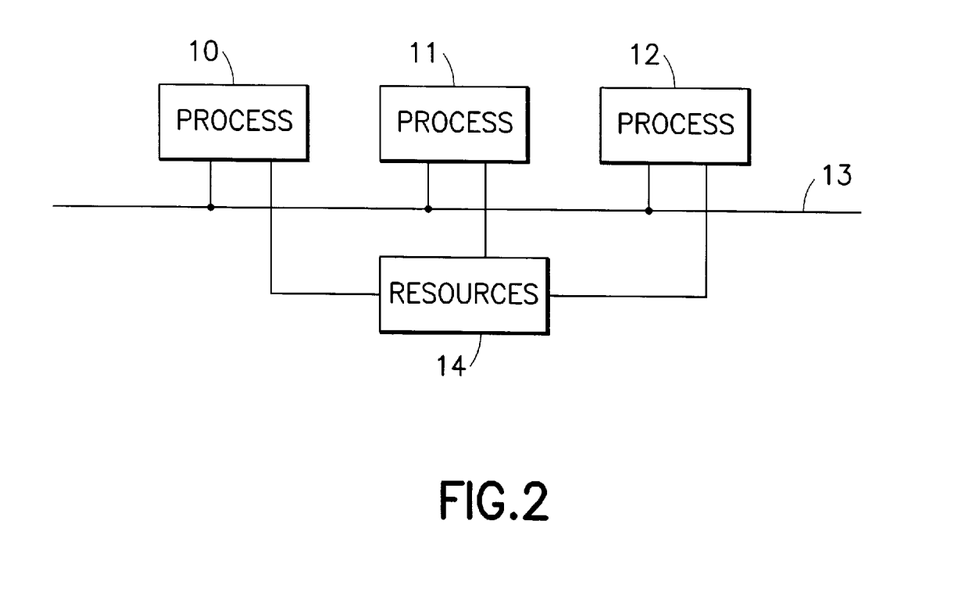
FIG. 2 is a fault tolerant system with an active and several standby processes.

The invention may also be used in a configuration comprising more than two processes, such as the one of FIG. 2. For the purpose of example, the fault tolerant system of FIG. 2 comprises three processes 10, 11 and 12, that communicate over a communication channel 13. These processes share dedicated common resources 14, the access to which is reserved to the processes. As stated above, and as it will be explained below in detail, these resources may for instance comprise a signalling interface unit. These resources may only be used by one process at a time—if there should be only one process active at a given time.

Assume process 10 is active, while processes 11 and 12 are in standby. If there is some communication problem between active process 10 and first standby process 11, first standby process 11 will consider that active process 10 is down, will seize resources 14 and become active; at the same time, it will notify second standby process 12 that it is becoming active. The formerly active process 10 will get an error message or some other known message when trying to seize common resources 14, so that it will know that another process has become active, and will therefore suicide.

In the final state, formerly active process 10 is down, and may be restarted as a new standby process; formerly standby process 11 is active, while formerly standby process 12 is still in standby. The final state is a stable state, with only one active process, that is process 11.

Starting from the same initial state (process 10 active, processes 11 and 12 in standby), if there is some problem between processes 11 and 12, standby process 12 will become active, and similarly formerly active process 10 will suicide. Formerly active process 10 may also notify standby process 11 of its suicide, so that standby process 11 will not try to become active. The final state is thus again a stable state. If formerly active process 10 does not notify formerly standby process 11 of its suicide, the situation is equivalent to the case of total failure of the communication channel, and is explained below.

Starting again from the same initial state (process 10 active, processes 11 and 12 standby), if there is a total communication failure between all the processes, standby processes 11 and 12 will consider active process 10 dead and will become active. The first of the two standby processes 11 and 12 to become active (say process 11) will seize resources 14; this will cause suicide of formerly active process 10. The second process 12 of the two standby processes will then become active, and will seize resources 14: this will cause suicide of the first process 11 of the two formerly standby processes, that has just become active: it will then realise that resources 14 are being seized and will therefore also suicide. The final state is thus a stable state.

Whatever the case, the final state is thus a stable state. The structure of FIG. 2 may be extended to any number of processes, as it will be apparent to a person skilled in the art. The invention may also be applied if more that one process is to be active at the same time: in this case, simultaneous access to the dedicated common resources should be allowed to the number of possible simultaneously active processes.

The invention thus provides a simple and efficient method for preventing split-brain syndrome that may be applied to any number of processes with any number of simultaneously active processes.

In a preferred embodiment of the invention, each group of fault tolerant processes running for a same application communicate with that application through a common signalling and interface unit. This unit is application specific, and therefore constitutes common dedicated resources, that may and will only be used by the processes. This signalling and interface unit may be used at a given time by one active process only; it will always grant access to the latest newly active process that tries to obtain access, and will return an error message to any other active process, that had been using the resources in the recent past, and that tries to get access to it.

For an active process, receiving such an error message is a clear indication that, according to the invention, it should suicide, since this means that another process has become active.

This assumes that the signalling and interface unit will be able to handle some priority between accesses from different processes, so that the newly promoted active process will have a higher priority level that the formerly active process. This may be embodied by different methods, such as providing that the last in time to activate is the highest priority.

This priority management is a simple way to ensure that any active process may detect that another process has seized, or is using, the dedicated resources. Another solution is to provide the dedicated resources with more elaborate messaging means.

Obviously, if more that one process should be active at one time, the dedicated resources will accept requests for access from more than one process, and the invention may also be used.

The invention also provides a fault tolerant system ensuring a platform or system linked management of fault tolerance decision, rather than an application-linked management.

Figure 3:
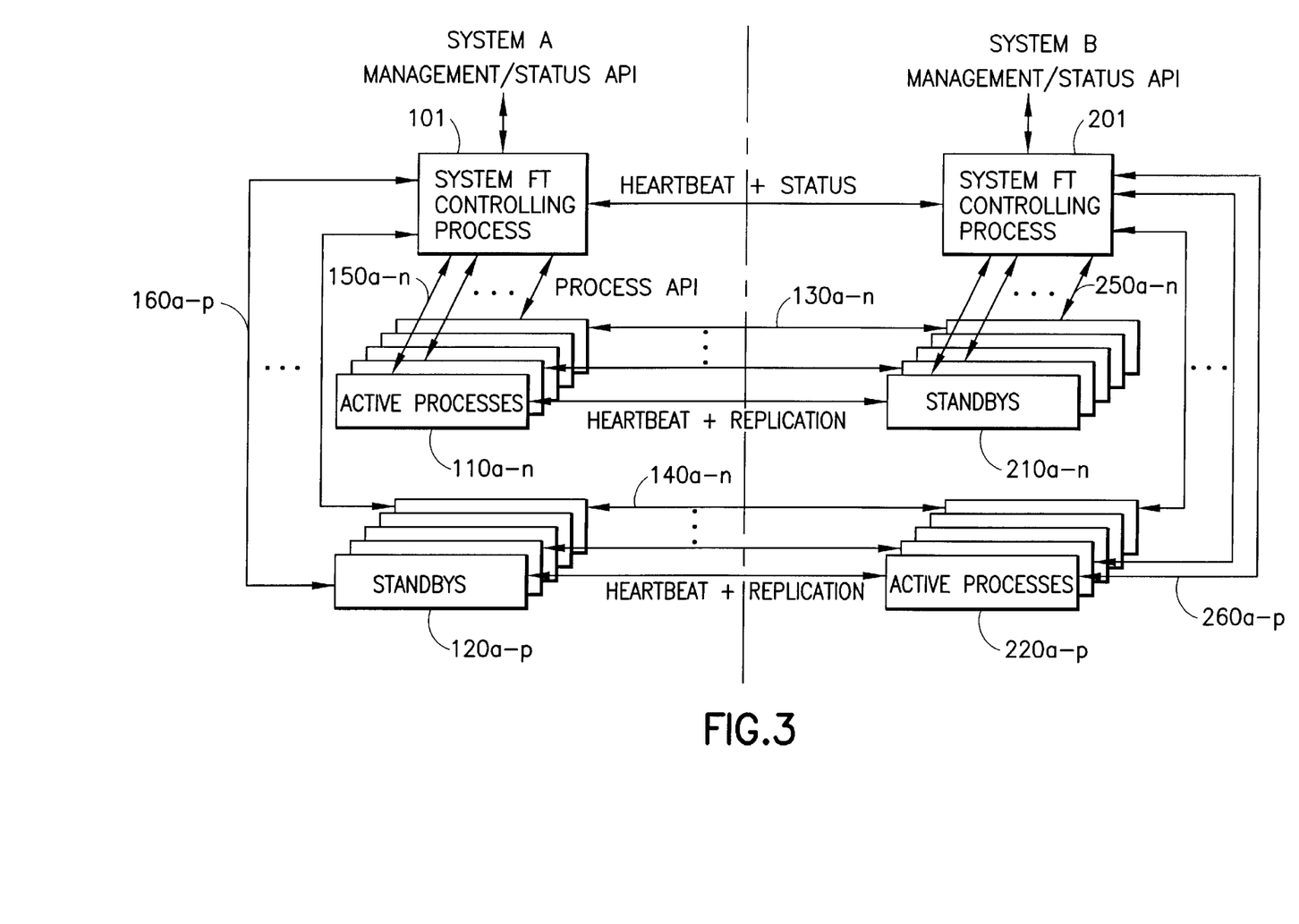
FIG. 3 is the general architecture of a fault tolerant software system using replicated platforms.

The dual system of FIG. 3, exemplifies the invention in the simplest fault tolerance architecture where an active process is provided with a standby process. It comprises two systems A and B, for instance provided on different machines or platforms.

On each system, several processes are running. Basically each system A, respectively B, comprises a system fault tolerance controlling process 101, respectively 201, a series of active processes 110a to 110n, respectively 220a to 220p, and a series of standby process, 120a to 120p, respectively 210a to 210n.

Each active process 110a to 110n (220a–220p) in a system is in communication with a corresponding standby process 210a–210n (120a–120p), over communication channels symbolised on FIG. 3 by arrows 130a–130n (140a–140p). This communication between pairs of corresponding active and standby processes allows for health monitoring of the processes, for instance with a heartbeat method; it also allows for replication of data from the active process to the standby process, so that the standby process may, if necessary, be promoted to the active state. This is explained in more detail below.

According to the invention, each standby or active process on a platform is controlled by the corresponding fault tolerance controlling process, as symbolised by arrows 150a–150n, 160a–160p, 250a–250n, 260a–260p in FIG. 3.

The fault tolerance controlling processes 101, 201 communicate over a communication channel 105; this communication allows for health monitoring of the FTC processes, and provides for exchange of status information regarding the different processes running on each system.

As symbolised by arrows 170 and 180 in FIG. 3, each FTC process has an interface that enables management or status information to be exchanged with outside processes or applications. This information may comprise an external switchover command. The interface is for instance an application programmatic interface provided in the FTC processes.

The operation of the system of FIG. 3 is the following. At initialization of each system A, B, the FTC process 101, 201 is started and the communication channel 105 between the two FTC processes is opened.

Each FTC process is thereafter responsible for all active or standby fault tolerance processes running on its system. It receives from the processes notifications about their state, (communication channels 150a–150n, 160a–160p, 250a–250n, 260a–260p) and may issue commands to them to change between different states. In a preferred embodiment of the invention, the FTC process is solely responsible for deciding when a process should become active; in other words, an active process may decide to suicide or switch to a standby state on its own. In case several standby states are provided, a process may also change from one standby state to another, without a command from a FTC process. However, no process may switch to the active state without a command from a FTC process.

Each FTC process directly receives information about the state of the different processes on its own system. It also receives information regarding the state of the processes on the other system; this information may come directly from the other FTC process. A FTC process on one system—say system A—may receive information regarding an active or standby process 210a–210n, 220a–220p on the other system from the corresponding standby or active process 100a–110n, 120a–120p through communication channels 130a–130n, 140a–140p. Thus, each FTC process may know the state of each process on its system and on the other system.

Similarly, each FTC process may directly send commands or messages to the process running on its own platform, using the communication channels 150a–150n, 160a–160p, 250a–250n. It may also send commands or messages to the processes running on the other platform, either through communication channel 105 via the other FTC process or through communication channels 130a–130n, 140a–140p, via the processes running on its own platform.

It will be apparent to the person skilled in the art that the two FTC processes, with the communication channels shown in FIG. 3 form a fault tolerant system. Thus, with the architecture provided in FIG. 3, fault-tolerance controlling means, comprised of the two FTC processes, may control the state of processes on the dual system. This provides a solution in which there is no longer any need for every fault tolerant application to manage its own active and/or standby process. Application programming is simplified and duplication of similar functions is avoided. Fault detection, and promotion of a process from the standby to the active state are controlled by the FTC means and are not application dependent, but may be run similarly for all applications running on the dual system of FIG. 3. Conflicts between FT processes is also dealt with: a rule of decision making within the FTC means may be provided; for example, in case of conflict between the FTC processes regarding a given pair of standby and active processes, the FTC process of the system with the standby process may prevail and take the decision.

Figure 4:
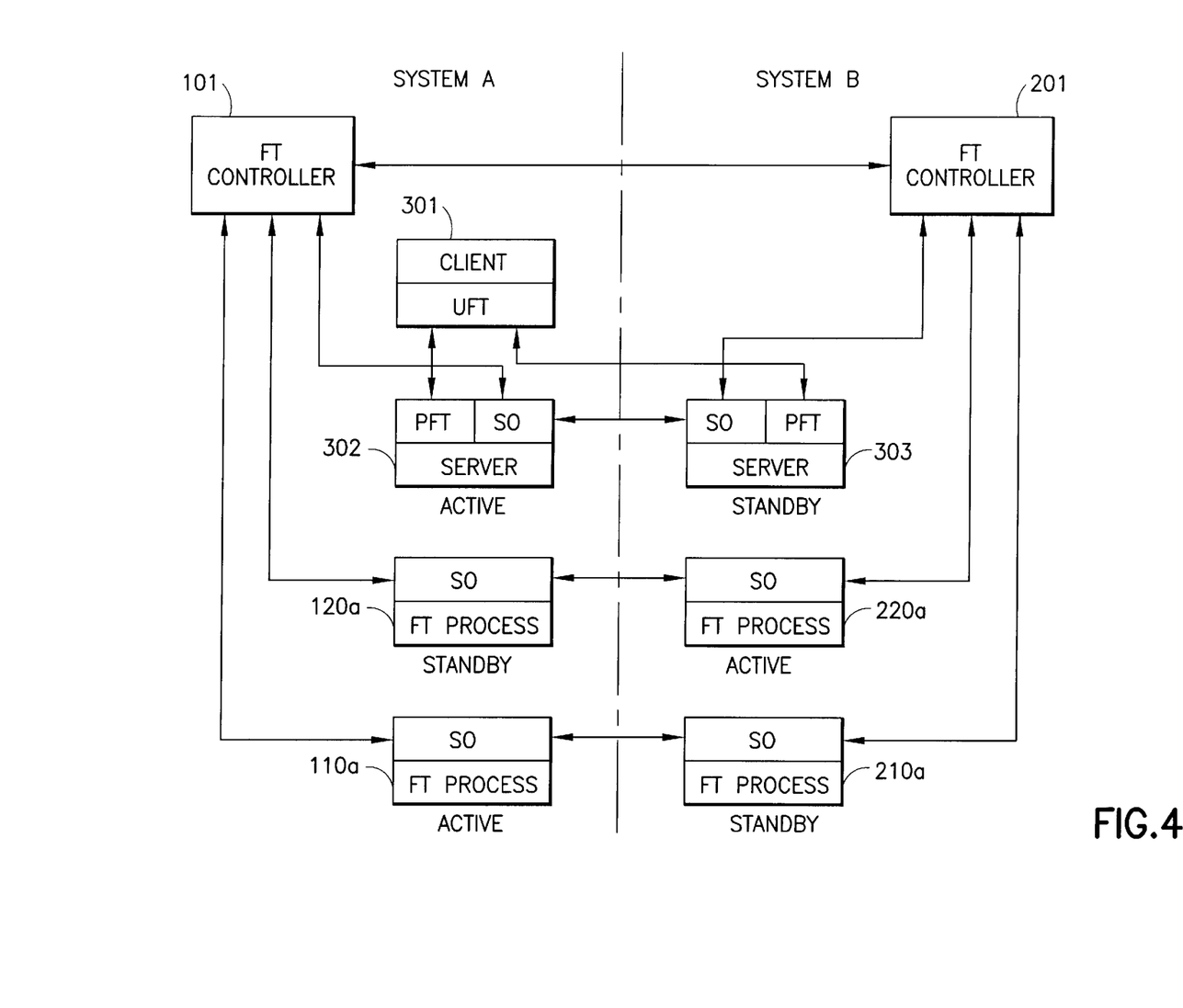
FIG. 4 is a more detailed view of the system of FIG. 3.

FIG. 4 discloses, in more detail, a general architecture of a system like the one of FIG. 3. FIG. 4 shows how the communication channel of FIG. 3 may be implemented. It also shows how a client application may access a fault tolerant server. FIG. 4 again exemplifies the invention in a dual system, each system again comprising a FTC process (101, 201) so as to constitute FTC means for controlling the FT processes in each system.

For the sake of example only, the system of FIG. 4 comprises a client application 301, an active FT process 302 on one system providing server functions for this client, a corresponding standby FT process 303 on the other system; each system also comprises an active FT process 110a, respectively 220a, while the other system comprises a corresponding standby FT process 220a, respectively 120a. It is assumed that fault tolerance is provided on the "server" side, but not on the client or user side.

The system in FIG. 4 uses three libraries, that is a switchover library, a user FT library and a process FT library. In the system of FIG. 4, each FTC process is provided with the necessary routines for controlling the FT process on its system.

The switchover library (referenced "SO library" in the rest of the specification) provides fault detection and switching functions, for each FT process running on the system. The SO library provides each FT process running on a system with an application programmatic interface to the corresponding FTC process running on that system. This enables each FT process to inform the FTC process running on its system of its current state. It also enables each FT process to receive change state commands from the FTC process.

The SO library also provides each active/standby FT process with a communication channel with the corresponding standby/active FT process. This channel may be used by the FT processes for exchanging replication data and is also used by the SO library to exchange heartbeat messages for failure detection.

The SO library will comprise the necessary number of routines to fulfil these functions. It should be noted that the SO library normally covers fault detection and switching functions, that are independent from the nature of the FT process. The SO library provides a FT process with a channel for replication data. However, data replication will usually be the responsibility of each process, and will be a process-linked decision. This ensures that the SO library remains simple and effective for any kind of process, whatever the nature and extent of the data to replicate.

Typically, the SO routines will comprise:
a routine for initialising a SO FT subsytem for a FT process (reading configuration files, opening connections, initialising data structures);
routines for sending and/or receiving messages between active and standby processes, so that a FT process may communicate with its peer;
a routine to be called by a FT process for heartbeat monitoring of its peer process, that returns a state of the corresponding or peer process;
a routine enabling a FT process to inform the system FTC process of its state;
a routine enabling a FT process to inform the system FTC process that the corresponding process has died, so that a FTC process is informed of the state of processes running on the other system;
routines enabling the FT process to obtain the state of the other processes having the same class name.

The SO library may use different message processing policies: messages may be sent immediately, or blocked or queued into buffers; in this case, the SO library will comprise routines for sending or flushing some or all of the queued messages, if any, and for changing the message processing policy.

These routines may be provided by a person skilled in the art, in correspondence with the system used for embodying the invention.

Turning now to possible client-FT server type processes, the invention proposes to use a user fault tolerant library (referenced "UFT library" in the rest of the description) and a process fault tolerant library (referenced "PFT library" in the rest of the description).

The UFT and PFT libraries will provide client-server orientated processes with a messaging channel between a single client end 301 and a multiple FT server end, in the example of FIG. 4, a standby server end 303 and an active server end 302. The invention suggests that the set of FT server processes are given a "class name" and that client process 301 communicates with the FT server processes by using that class name. "Class name" utilization and the direction of messages to the active and/or server process is handled by the UFT and PFT libraries, and provides grouping of the FT processes.

The UFT library provides a client process with a messaging channel to the active and standby processes. It also provides switchover functions, as explained below. The routines in the UFT library should be accessed by an application programmatic interface provided in each client process. The provision of the UFT library will ensure that this application programmatic interface is limited and will be simple to implement in each application.

The UFT library routines should comprise routines for the establishment of the communication channels with the active/standby server processes, for the transmission of messages to the server processes, and for the reception of messages from the processes. It also comprises switchover routines, so that the UFT library will be able to handle a switchover from the active server process to the standby process. Again, this is normally transparent for the client process using the UFT library.

Typically, the UFT library may comprise the following routines, that may be accessed by the client process application programmatic interface:

a routine for initialising connections with FT processes having a given class name;

routines for configuring a communication channel, or for requesting configuration information on a connection;

routines for sending messages to both processes in the class name;

a routine for closing a given connection;

routines for sending and receiving messages to the standby process in the class name, for replication purposes.

The UFT library may use different message processing policies: messages may be sent immediately, or blocked or queued into buffers; in this case, the UFT library will comprise routines for sending or receiving a message to and from a queue, a routine for changing the message processing policy, routines for receiving messages from a receive queue, from the active process in the class name, from the standby process in the class name, or from both processes.

PFT library comprises routines for initialisation, for establishment of the communication channels with the client process, for transmission of messages to the client process, and for reception of messages from the client process. The PFT routines comprise switchover routines for notifying the UFT library when a switchover occurs further to a command from a FTC process.

Typically, the PFT library may comprise the following routines that be used by the server end FT processes:

a routine for initialising a connection to a peer FT process, to be called at process initialisation by class name;

a routine for requesting configuration information on a connection;

routines for sending or receiving a message to and from a given connection;

a routine for closing a given connection with the user or client process;

a routine for informing the user or client process that a switchover is going to take place, further to a command of a FTC process;

a routine enabling the active server process to perform a switchover.

The PFT library may use different message processing policies: messages may be sent immediately, or blocked or queued into buffers; in this case, the PFT library will comprise routines for sending or receiving a message to and from a queue, a routine for changing the message processing policy, routines for receiving messages from a receive queue.

The operation of the initialisation protocol of the UFT/PFT libraries is the following. When a FT process starts, it will use the PFT library routine for initialising a listening connection. When a user or client process starts, it will use the UFT library routine for initialising connections with FT processes having a given class name; when a connection is opened, the UFT library routine will ask the PFT library for the current state of the server process; the UFT library will check the consistency of the results, and if the results are not consistent, it will retry opening the connections, and if necessary exit after a given number of tries. The UFT/PFT libraries will not try to resolve any inconsistency (such as two peer processes considering themselves active at the same time), since this is done by the FTC processes.

As shown in FIG. 4, a FT process may use only the SO library routines, or it may use the SO and the PFT libraries together.

In a preferred embodiment of the invention, physical connections will be handled transparently by the libraries in any case. This ensures that the user of one of the libraries—a client process, a FT process, or a FT server process—does not have to care about physical connections, and should not have to handle socket configuration and management. A possible implementation of this transparent handling of connection is to provide a configuration server. This configuration server will provide the SO, UFT and PFT libraries with information regarding the FT processes running on each system, with the corresponding addresses, and a possible indication of priority. This will enable each library to use connection ID, independently of associated physical connection data.

The provisions of the SO, UFT and PFT libraries, as shown in FIG. 4, ensures again that programming requirements in each process are kept to a minimum; the invention thus provides fault tolerant capabilities which any process may use with simple adaptation only.

Figure 5:
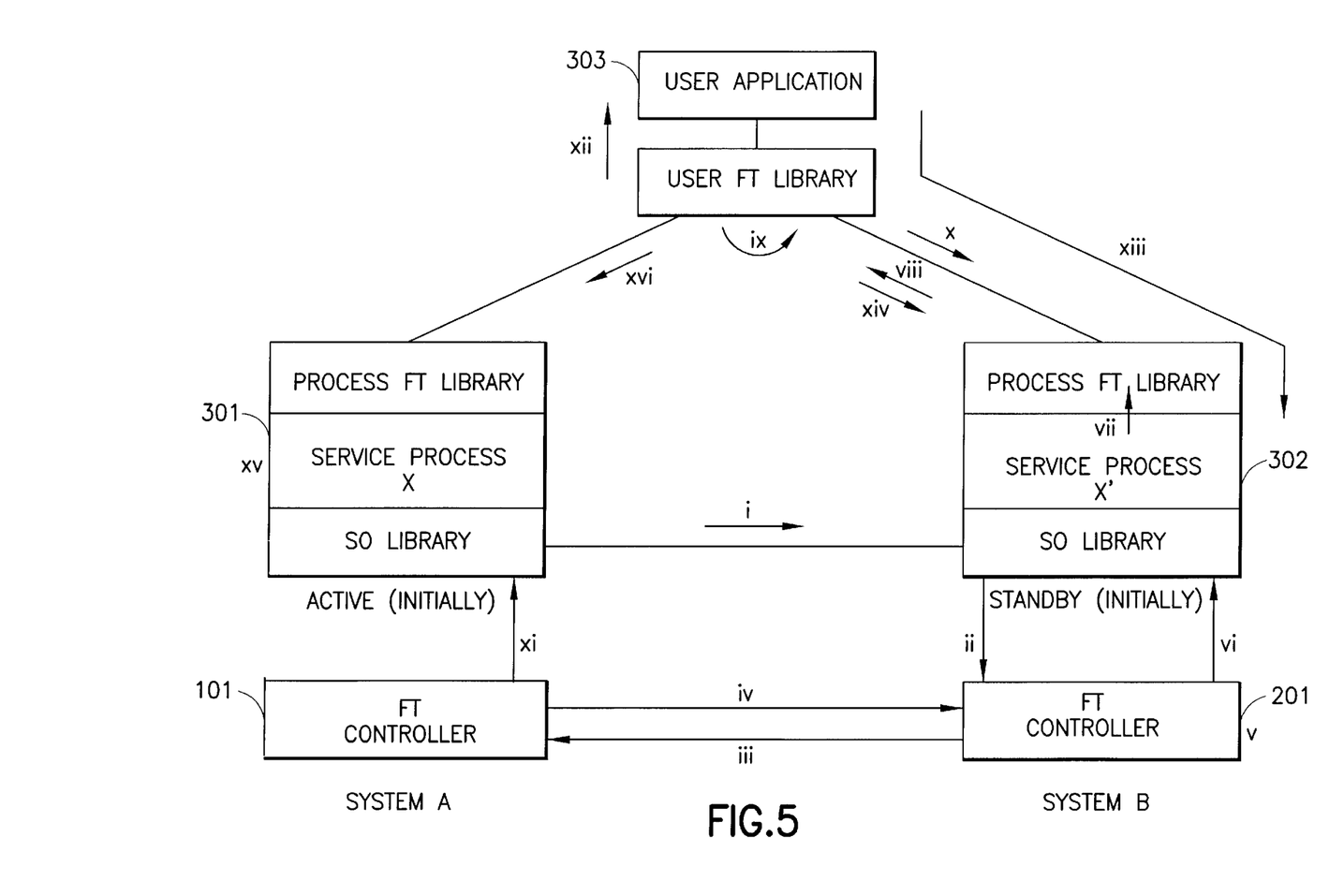
FIG. 5 is a possible initialisation and switchover sequence in the system of FIG. 4.

FIG. 5 shows a possible initialisation and switchover sequence in the system of FIG. 4. FIG. 5 shows again the system of FIG. 4, but for the sake of explanation, only the FT server processes and the user process were represented.

When a system is started, the corresponding FTC process 101, 201 is started, and a communication channel with the corresponding FTC process is opened. The FTC process is provided with a list of the FT process running on its system, and it will try to open them at start-up time, according to the configuration options of the configuration server. Again, a FT process may only get to the active state on command of a FTC process.

In case a FTC process fails, all the child FT process running on its system will exit as soon as they detect it, due for instance to an error response to a SO library routine. This is another solution for preventing split brain syndrome.

As explained above, a FTC process is responsible for switchover of its child FT processes to the active state. In the simplest embodiment of the invention, a FTC process is provided on each system, and each FTC process is responsible for all the FT processes running on its system. However, if the FTC means do not comprise a FTC process on each system, but have a different architecture, a FTC controller may be responsible for only part of the FT processes on its system, or may also be responsible for FT processes on another system.

As explained above, a rule of decision making should be provided within the FTC means, in case of conflict. An example of such a rule was given above.

At start-up, the FTC processes 101, 201 are started. Each FT process 302, 303 is started, according to the configuration options of the configuration server; each FT process 302, 303, uses the PFT library initialisation routine for opening a listening connection, as explained above. If there is some inconsistency problem, it will be reported to the FTC processes, and settled by the FTC processes.

When the user process 301 is started, it will use the UFT library routine for initialising connections with FT processes 302, 303, as explained above.

In the normal operation state, process 302 is assumed active, and process 303 is assumed passive. Health monitoring of a peer process is performed by each process with the heartbeat routine of the SO library. The SO library may be used for exchanging replication messages, according to the application, and under control of the application. If heartbeat is not received, a FT process marks the other process as dead when the heartbeat reception times out. This is reported to the FTC process with the corresponding routine of the SO library.

For instance, on FIG. 5, heartbeat messages from FT process 302 to its peer process 303 are symbolised by arrow i. At some time, SO library in FT process 303 may fail to receive the heartbeat messages from active FT process 302. After time-out expires, process 303 will mark process 302 as dead, and will stop sending its own heartbeat messages: this is because in dual LAN case, if one LAN fails, only one process would otherwise see its heartbeat stop. Process 303 then inform its FTC process that process 302 is dead, with the SO library routine, as symbolised by arrow ii.

FTC process 201, when receiving this message, will use a decision-making algorithm for deciding that process 302 is indeed dead, and for deciding which action should be taken. This algorithm may involve obtaining the last state of process 302 from the other FTC process 101, the other system's state, the LAN/CPU/memory state.

Thus, FTC process 201 will ask FTC process 101 for the state of process 302, see arrow iii. This request is answered by FTC process 101, see arrow iv.

If process 302 is indeed also marked dead by FTC process 101, there will be no conflict: this may be the case if process 302 did not answer a request of FTC process 101. On the other hand, if FTC process 101 does not see process 302 as dead, a conflict will arise and be settled according to the decision-making rule mentioned above.

FTC processes 101 and 201 may thus decide, at step v, that process 303 should be made active. The change of state command is then sent to process 303 by FTC process 201, see arrow vi. Process 303 then becomes active.

Process 303 will then call the switchover routine of the PFT library for informing the user process that switchover is going to take place, see arrow vii. PFT library will then send switchover message to the UFT library, see arrow viii.

UFT library will then close the connection to process 302, with the corresponding UFT library routine. It will mark process 303 as the new active process for the direction of messages, see arrow ix. UFT library will then acknowledge message viii, see arrow x.

FTC process 101 will also send process 302 a change of state message xi, telling it that it should change to the standby state. This will avoid any split brain syndrome. Process 302 will then exit.

UFT library will inform process 301 of the switchover, via call back, see arrow xii. This will enable process 301 to send the necessary replication information to FT process 303, that is now marked as active in the UFT library. This will ensure that necessary replication has taken place, on an application-basis. Replication information may be necessary or not according to the circumstances, and depending on whether replication information had been sent previously from process 302 to process 303.

Since process 303 is marked active in the UFT library, messages will be sent to it, see arrow xiv; as explained, this is transparent for the user process 301.

Some time later, process 302 may be restarted (see xv), if it had indeed failed. UFT library may then retry connection to process 302, and process 302 may then be used as standby. This will depend on the information provided by the configuration server, and notably on the priority given to each process.

The switchover sequence of FIG. 5 exemplifies the case of a switchover in a FT server end. Switchover in case there is no user process will be handled similarly, with the help of the SO library, and of course without using the PFT/UFT libraries.

The switchover sequence of FIG. 5 exemplifies how the invention may provide fault detection and promotion of a standby process to the active state, and switching of all communication from the dead and formerly active process to the new active process. This is provided by the invention independently of any application that is being run, and will work similarly for any application. This provides a simple and efficient management of fault tolerance. The invention provides messaging, coordination, that is direction of the messages to the active process, grouping of the set of FT processes, and availability, that is switchover to the standby process.

The invention has been described for the case of a dual system, with a FT group of process having an active and a standby process, since this is the simplest configuration for providing availability. The invention is easily abstractable to any number of systems, and to any number of FT processes in a given group: it will be especially efficient for a platform comprising multiple pairs of systems, where for any one system's processes all the peer processes are on one other system. The FTC means of the invention comprise a FTC process on each system: this also may be changed, as explained above.

We claim:

1. A method for preventing split brain syndrome in a fault tolerant platform having at least one process in an active state of execution and at least one process in a standby state, switchover capabilities for promoting a process in the standby state to an active state, and commonly available resources dedicated to the processes in the active and standby states, said method comprising the steps of:

limiting simultaneous access to the commonly available resources to a maximum number of processes in the active state;

giving priority of access to the commonly available resources to processes last promoted to the active state; and terminating an active state of a process that is in an active state of healthy execution when said process in an active state of healthy execution is not allowed access to the commonly available resources.

2. A method according to claim 1, wherein said fault tolerant system has one process in the active state and one process in the standby state, and wherein access to the commonly available resources is limited to one process in the active state.

3. A method according to claim 1, comprising the further step of:

causing an active process that leaves its active state to inform other processes in a standby or active state.

4. A fault tolerant platform comprising:

at least two systems;

multiple processes in an active state running on said systems;

each process in an active state having at least one corresponding replicate process in a standby state concurrently running on a different one of said systems to the system running said process in an active state;

fault-tolerance manager means for monitoring said processes and responsive to an apparent fault in one said process for individually promoting a corresponding replicate process in a standby state to the active state; and first communication channels between said processes in an active state and said fault-tolerance manager means and between said processes in a standby state and said fault-tolerance manager means;

the fault-tolerance manager means comprising a respective fault-tolerance controlling process running on each system, and second communication channels between said fault tolerance controlling processes for exchanging health monitoring and status messages, said first communication channels comprising a communication channel between a process in an active or standby state running on a system and the fault-tolerance controlling process running on a same said system.

5. A fault tolerant platform according to claim 4, further comprising a third communication channel between a process in an active state and a corresponding replicate process in the standby state, for exchanging health monitoring and replication data messages.

6. A fault tolerant platform according to claim 4, further comprising at least a user process, and fourth communication channels between said user process and said process in the active state, and between said user process and said process in the standby-state.

7. The fault tolerant platform as recited in claim 4, further comprising:

commonly available resources available to said process in the active state and said corresponding replicate process in the standby state; and wherein the fault-tolerance manager means controls exit of said process in an active state to said standby state, in dependence upon sensing that said commonly available resource is being seized by said peer process.

8. The fault tolerant platform as recited in claim 4, further comprising:

commonly available resources available to said process in the active state and said corresponding replicate process in the standby state; and wherein the fault-tolerance manager means controls exit of said first process in an active state to said standby state, in dependence upon sensing that said first process in an active state is not allowed to access to said commonly available resources.

9. The fault tolerant platform according to claim 8, wherein said fault tolerant platform has one process in the active state and one process in the standby state, and wherein said means for limiting limits access to the commonly available resources to one process in the active state.

10. An apparatus for managing fault tolerance in a platform comprising:

at least two systems;

at least a first process in an active state running on one system;

at least one corresponding replicate process in a standby state running on another system;

fault-tolerance controlling means for monitoring said processes and responsive to an apparent fault in one said process for individually promoting a corresponding replicate process in said standby state to the active state;

first communication channels comprising a communication channel between a process in an active or standby state running on a system and a fault-tolerance controlling process running on a same said system; and wherein the fault-tolerance controlling means comprises a respective fault-tolerance controlling process running on each system and second communication channels between fault-tolerance controlling processes, and wherein the fault-tolerance controlling process running on each said system is responsible for promoting processes running on that system to the active state, and for making processes running on that system exit from the active state.

11. An apparatus for managing fault tolerance according to claim 8, wherein a fault-tolerance controlling process running on a system informs each fault-tolerance controlling process running on another system of a state of processes running on its system, on said second communication channels.

12. An apparatus for managing fault tolerance according to claim 8, wherein a process running on one system informs the fault-tolerance controlling process running said one system of its state, on said first communication channels.

13. An apparatus for managing fault tolerance according to claim 8, wherein said platform comprises third communication channels between said first process in an active state running on one system and said corresponding replicate process in a standby state running on another system, said apparatus further comprising means for mutual health monitoring of said processes in an active and standby state on said third communication channels.

14. An apparatus for managing fault tolerance according to claim 8, wherein said platform comprises third communication channels between said first process in an active state running on one system and said corresponding replicate process in a standby state running on another system, and wherein a process running on a system informs its corresponding replicate process of its state using said third communication channels.

15. An apparatus for managing fault tolerance according to claim 14, wherein a process running on a system informs the fault-tolerance controlling process running on its system of the state of its corresponding replicate process using said first communication channels.

16. An apparatus for managing fault tolerance according to claim 8, wherein said platform comprises third communication channels between said first process in an active state running on one system and said corresponding replicate process in a standby state running on another system, and wherein a process running on a system exchanges replication data messages with its corresponding replicate process, using said third communication channels.

17. An apparatus for managing fault tolerance according to claim 8, wherein said platform further comprises at least a user process, and fourth communication channels between said user process and said first process in the active state, and between said user process and said corresponding replicate process in the standby state, and wherein said first process in the active state, and said corresponding replicate process in the standby state are grouped under a class name, and wherein said user process sends messages to the class name, said messages being directed to the process in the active state transparently for the user process.

18. An apparatus for managing fault tolerance according to claim 8, wherein said platform further comprises at least a user process, and fourth communication channels between said user process and said first process in the active state, and between said user process and said corresponding replicate process in the standby state, and wherein replication messages are sent by the user process to the process in the standby state.

19. The apparatus as recited in claim 10, further comprising:

a commonly available resource available to said first process in the active state and said corresponding replicate process in the standby state; and wherein the fault-tolerance controlling means controls exit of said first process in an active state to said standby state, in dependence upon sensing that said commonly available resource is being seized by said corresponding replicate process.

20. The apparatus as recited in claim 10, further comprising:

commonly available resources available to said first process in the active state and said corresponding replicate process in the standby state; and wherein the fault-tolerance controlling means controls exit of said first process in an active state to said standby state, in dependence upon sensing that said first process in an active state is not allowed to obtain access to said commonly available resources.

21. A fault tolerant platform having at least one process in an active state of execution and at least one process in a standby state, switchover capabilities for promoting a process in the standby state to an active state, and commonly available resources dedicated to the processes in the active and standby states, and means for preventing split brain syndrome, said means comprising:

a) means for limiting simultaneous access to the commonly available resources to a maximum number of processes in the active state;

b) means for giving priority of access to the commonly available resources to processes last promoted to the active state; and c) means for terminating an active state of a process that is in an active state of healthy execution when said process in an active state of healthy execution is not allowed access to the commonly available resources.

22. The fault tolerant platform according to claim 21, further comprising:

d) means for causing an active process that leaves its active state to inform other processes in a standby or active state.

* * * * *